April 25, 1933.   C. H. CLINTON ET AL   1,905,152
MINERAL WOOL AND METHOD OF AND APPARATUS FOR GRANULATING SAME
Filed April 22, 1931   2 Sheets-Sheet 2
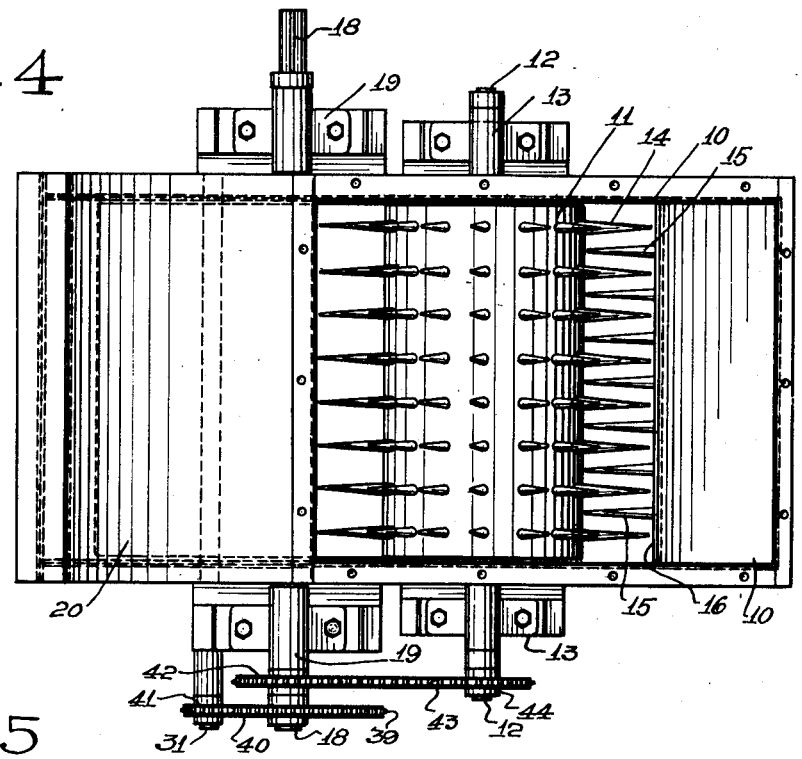
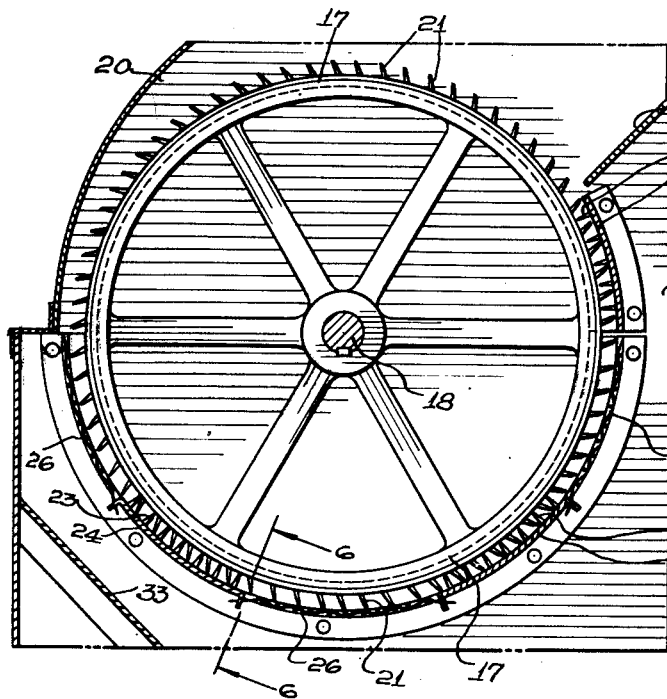
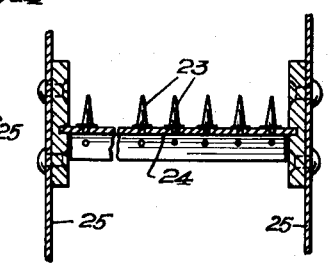
INVENTOR
CHARLES H. CLINTON.
PAUL F. THEOBALD.
BY ROGER H. STITT.
ATTORNEY Patented Apr. 25, 1933

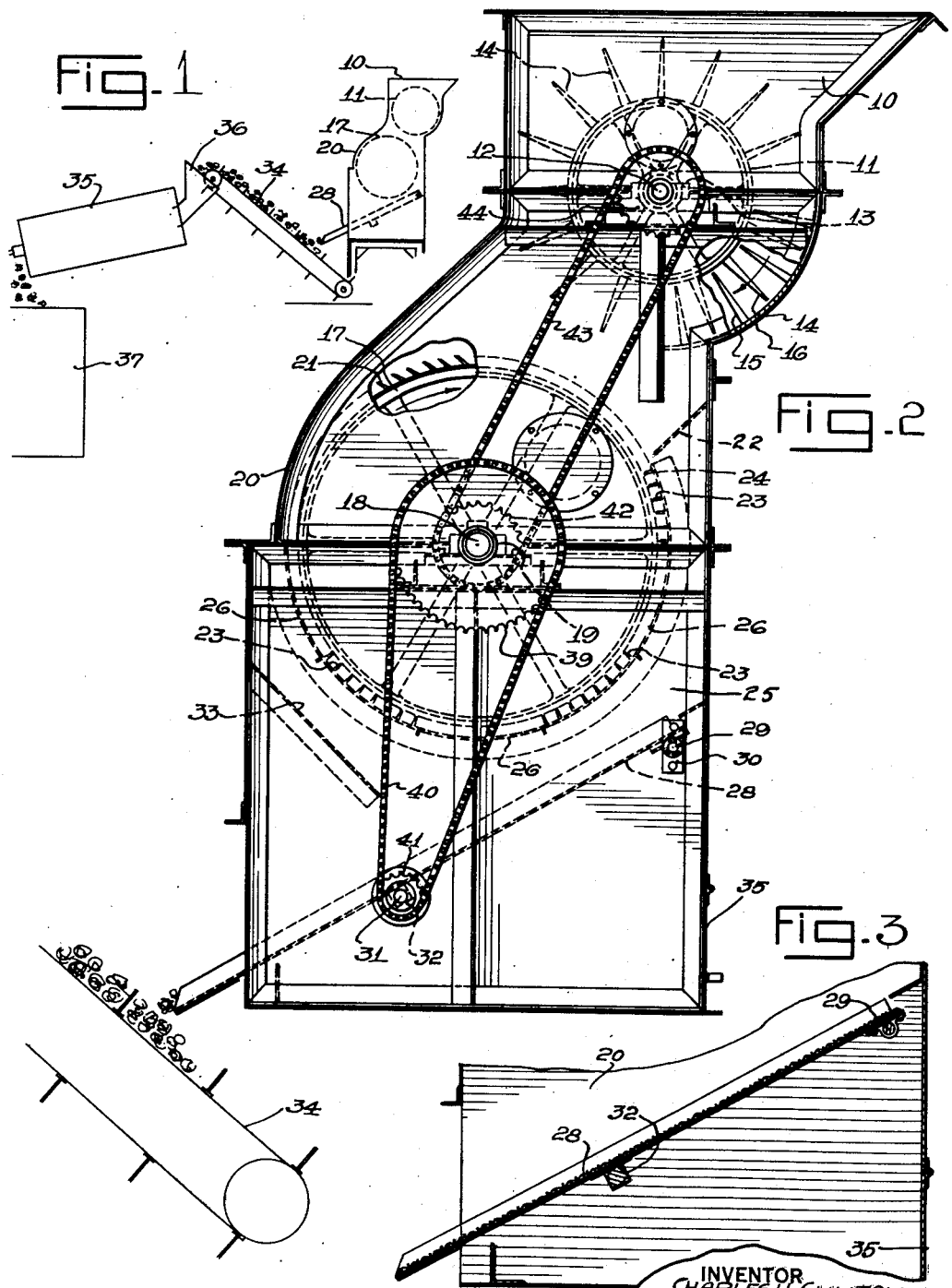

1,905,152

UNITED STATES PATENT OFFICE

CHARLES H. CLINTON, OF HINSDALE, AND PAUL F. THEOBALD AND ROGER H. STITT, OF CHICAGO, ILLINOIS, ASSIGNORS TO UNITED STATES GYPSUM COMPANY, OF CHICAGO, ILLINOIS, A CORPORATION OF ILLINOIS

MINERAL WOOL AND METHOD OF AND APPARATUS FOR GRANULATING SAME

Application filed April 22, 1931. Serial No. 531,982.

This invention relates to an improved fibrous material and a method of subdividing the same, and has reference more particularly to a granulated mineral wool, and a method especially adapted for granulating mineral wool and removing beads of slag from the mass of granules.

The invention further relates to an apparatus for carrying out the above method.

It is customary to utilize granulated mineral wool as a base for porous, molded, acoustical tile used for the facing of walls and ceilings of buildings to correct acoustical conditions in the rooms. For this purpose it is desirable to have granulated wool having a minimum amount of dust, a minimum amount of beads of slag, a uniform diameter of granules with an absence of large granules, and mineral wool with harsh, stiff fibers which will not wilt and mat appreciably when mixed with water or solutions of binding materials in water. No entirely satisfactory method or apparatus has been heretofore proposed for making this product having the desired combination of qualities. Granulated mineral wool of about the same nature is also suitable for use in heat insulating the walls of buildings, coffee urns, ovens, water tanks and other containers for holding heated materials.

An object of this invention, therefore, is to provide a method of granulating mineral wool where a product of high quality is produced, said product having the combination of desired qualities hereinabove noted.

Another object of the invention is to provide a granulated mineral wool and an apparatus suitable for making same with a minimum of operating cost and a maximum of quality; also to improve granulated mineral wool, methods of and apparatus for manufacturing same in other respects hereinafter specified and claimed.

Reference is to be had to the accompanying drawings forming a part of this application, in which Fig. 1 is a diagrammatic elevation of our improved apparatus, Fig. 2 is an elevation of the granulator with parts broken away to disclose the construction, Fig. 3 is a sectional elevation showing the shaker screen for removing beads from the mineral wool, Fig. 4 is a plan view of the wool granulator, Fig. 5 is a sectional elevation through the granulator, and Fig. 6 is a sectional view through the granulator taken on line 6—6 of Fig. 5.

The mineral wool is usually manufactured by blowing compressed air through a stream of molten slag so that the wool is cooled and deposited in large masses. Beads are usually formed in the process and are distributed throughout the mass of mineral wool. These masses of mineral wool are placed in the hopper 10 of our improved machine, either manually or by means of an endless conveyor. A picker drum 11 is secured to a shaft 12, the latter being rotatably mounted in bearings 13 secured to the side walls of the hopper 10. This shaft 12 is caused to rotate continuously and teeth 14 secured to the outer periphery of the drum 11, serve to carry the mass of mineral wool downwardly and subdivide it into pieces. This picking action is aided by stationary spikes or teeth 15 secured to the inside of an arcuate section 16 which is positioned adjacent the end of the teeth 14. The rows of teeth 14 and 15 are alternated so that the rows of rotary teeth 14 pass between the rows of stationary teeth 15. This picker apparatus tears the matted masses of mineral wool into pieces about 4″ in diameter and feeds these pieces to a granulator drum 17 which is secured to a shaft 18, the latter being rotatably mounted in bearings 19 secured to the side walls of a granulator housing 20. The drum 17 carries a multiplicity of teeth 21 around its outer periphery, the teeth being arranged in annular rows. A deflecting plate 22 causes the pieces of mineral wool to be engaged by the teeth 21 and carried downwardly to engage stationary teeth 23 which are secured upon an arcuate plate 24, the latter being attached to the side walls 25 of the granulator housing 20. An arcuate screen 26 is mounted adjacent the outer ends of teeth 21 below the plate 24, said screen being attached to the side walls 25 and serving to remove any granules of mineral wool which are formed by the action of teeth 21 and 23. The teeth 21 are preferably arranged at an angle to the radial line so as to aid in forcing the granules of mineral wool outwardly through the screen 26. Other plates 24 and screens 26 are arranged in alternate fashion around the lower periphery of the drum 17 so that the mineral wool is subjected to alternate, granulating and screening operations or actions in order to avoid breaking up the granules and the fibers of mineral wool after the granules are formed and to immediately remove the granules upon formation without subjecting them to further mechanical action.

As the granules of mineral wool pass through the screens 26, they fall downwardly upon the upper end of an inclined shaker screen 28, which is pivotally mounted at its upper end upon a rod 29 secured in brackets 30. A rotatably mounted cam shaft 31 is arranged below the shaker screen 28 and is provided with a cam 32 which serves to oscillate the screen 28 as the shaft 31 is rotated. A deflecting plate 33 serves to direct the granules which pass through the last screen 26 onto the upper end of the shaker screen 28. The purpose of the screen 28 is to remove any beads which may be contained in the granulated mineral wool and said granulated wool is delivered from the lower end of the screen 28 onto an elevating conveyor 34 which carries the material upwardly to any suitable discharge point or storage bin. A door 35 is provided in the rear end of the granulator housing 20 underneath the screen 28 so that the beads passing through said screen can be removed from time to time by a scraper or other suitable means.

In some cases it will be desirable to substitute an ordinary chute instead of the screen 28, and to convey the granulated mineral wool upwardly by means of conveyor 34 into a rotary screen 35 as seen in Fig. 1. A hopper and chute 36 at the upper end of said screen serves to receive the granulated mineral wool and direct same into the upper end of the inclined rotary screen 35. This rotary screen will then remove the beads from the granulated mineral wool and the rotation of this screen aids in forming the granules into firmer balls which for some classes of work will be more desirable than the somewhat looser balls formed by the shaker screen 28. After leaving the rotary screen 35, the granulated mineral wool free from beads falls downwardly into a bin 37 ready for use.

The shaft 18 preferably extends beyond one of its supporting bearings and a pulley or sprocket wheel, not shown, serves to connect said shaft with a suitable source of power, such as an electric motor. The opposite end of said shaft 18 is provided with a sprocket wheel 39 which is connected by a chain 40 to a sprocket wheel 41 secured to the shaft 31. A sprocket wheel 42 is also secured on shaft 18 and is connected by a chain 43 to a sprocket wheel 44 secured to the shaft 12. By this driving mechanism, the three shafts 12, 18 and 31 are caused to rotate in unison.

In operation the masses of mineral wool are placed in the hopper 10 and are carried downwardly by teeth 14 between stationary teeth 15 to pick the wool apart into large pieces. These pieces fall downwardly upon the granulator drum 17 and inclined teeth 21 on said drum carry the mineral wool downwardly between stationary teeth 23 where granulation is accomplished. The granules of mineral wool formed pass outwardly through the screens 26 and fall downwardly upon the shaker screen 28 where the beads are removed. The granulated wool then falls from the lower end of the screen 28 onto an elevating conveyor 34. If desired, the elevating conveyor 34 may carry the granulated wool upwardly to a rotary screen 35 where the remainder of the beads are removed and the wool is more thoroughly granulated. The two screens 28 and 35 may be used separately or together. Oil may be added to the granulated mineral wool in the rotary screen 35 if desired, for the purpose of reducing its dusting qualities and also to improve its molding qualities when used for molding into acoustical tile.

Our machine is advantageous in that it produces granules of mineral wool of uniform size and a minimum of dusting, since the granules are removed from the field of action as soon as they are formed. Furthermore, there is no change in granule size if the teeth become broken or bent so that the production of cull acoustical tile with wool spots due to large pieces of mineral wool, is completely eliminated.

We would state in conclusion that while the illustrated examples constitute a practical embodiment of our invention, we do not wish to limit ourselves precisely to these details, since manifestly the same may be considerably varied without departing from the spirit of the invention as defined in the appended claims.

Having thus described our invention, we claim as new and desire to secure by Letters Patent:—

1. The method of granulating mineral wool which comprises subjecting pieces of wool to alternate granulating and screening actions so as to remove granules of mineral wool from the field of action substantially as soon as formed.

2. A method of treating mineral wool which comprises picking masses of wool into pieces, and subjecting said pieces to a granulating action to produce granules of mineral wool.

3. The method of treating mineral wool which comprises picking said mineral wool into pieces, and subjecting said pieces of mineral wool to alternate granulating and screening actions so as to produce granules of mineral wool containing a minimum of dust.

4. The method of treating mineral wool, which comprises subjecting pieces of said wool to alternate granulating and screening actions, so as to produce granules of mineral wool, and subjecting said granules of mineral wool to a further screening action to remove the beads therefrom.

5. The method of treating mineral wool, which comprises subjecting pieces of mineral wool to alternate granulating and screening actions, so as to produce granules of mineral wool, and subjecting said granules to a combined screening and rolling action to remove the beads therefrom and to produce granules of a tighter texture.

6. The method of treating mineral wool, which comprises subjecting masses of said wool to successive picking, granulating, screening and rolling actions.

7. In an apparatus for granulating fibrous materials, a picker for subdividing a mass of fibers into pieces, a rotary granulator member having granulating teeth throughout the periphery thereof, stationary teeth cooperating with said rotating teeth, and a screen for removing granules of fibrous materials formed by said rotating and stationary teeth.

8. In a machine for granulating fibrous materials, a picker for subdividing a mass of fibers into pieces, a rotary granulator member having teeth formed around the periphery thereof, alternating stationary teeth and screens arranged around the portion of the periphery of said granulator member, and means for moving the granulated fibrous material passing through said screen to a discharge point.

9. In a machine for granulating fibrous materials, a picker for subdividing a mass of fibers into pieces, a granulator for further subdividing said pieces into granules, and means for removing beads from said granules.

10. In a granulating machine, a picker for subdividing a mass of fibrous materials into pieces, means for further subdividing said pieces into granules, and a rotary screen for receiving said granules, said screen being adapted to remove beads from said granules and to act upon the surface of said granules to form tighter granules.

11. In a machine for granulating fibrous materials, a picker for subdividing a mass of fibers into pieces, a granulator for further subdividing said pieces into granules, and a shaker screen for receiving said granules and removing the beads therefrom.

12. In a machine for granulating mineral wool, three rotatably mounted shafts, means for driving said shafts in unison, a picker, a granulator and a shaker screen operatively associated with the respective shafts, and means for removing granules of mineral wool from said shaker screen to a discharge point.

13. In a machine for granulating mineral wool, a picker for subdividing a mass of mineral wool into pieces, a rotary granulator having teeth arranged around the periphery thereof, said rotary teeth being inclined at an angle to the radius of said granulator, stationary teeth arranged around the periphery of said granulator and cooperating with said rotary teeth to further subdivide said pieces of mineral wool into granules, and a screen positioned between two sections of stationary teeth for removing granules of mineral wool to a discharge point.

14. In a machine for granulating mineral wool, a rotary granulator member, a housing enclosing said granulator member, means for feeding pieces of mineral wool to said granulator member, and a screen for removing beads from the granules of mineral wool.

15. Granulated mineral wool having a substantially uniform diameter of granules, and being substantially free from beads.

CHARLES H. CLINTON.
PAUL F. THEOBALD.
ROGER H. STITT.